(12) United States Patent
Zhang et al.

(10) Patent No.: US 6,381,035 B1
(45) Date of Patent: Apr. 30, 2002

(54) EDGE COMPACTION IN ANTIALIASED IMAGES

(75) Inventors: Yeqing Zhang, Penfield; Robert P. Loce, Webster; Martin E. Banton, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/217,035

(22) Filed: Dec. 21, 1998

(51) Int. Cl.[7] .................................................. G06K 9/36
(52) U.S. Cl. ........................................ 358/1.9; 358/1.14
(58) Field of Search ................................. 358/1.9, 1.14; 382/239, 260–269

(56) References Cited

U.S. PATENT DOCUMENTS

| | | | | |
|---|---|---|---|---|
| 4,910,608 A | * | 3/1990 | Whiteman et al. | 358/433 |
| 5,710,836 A | * | 1/1998 | Shiau et al. | 382/237 |
| 5,768,432 A | * | 6/1998 | Schweid | 382/237 |
| 6,034,700 A | * | 3/2000 | Rumph et al. | 345/441 |
| 6,075,902 A | * | 6/2000 | Kojima | 382/260 |
| 6,091,511 A | * | 7/2000 | Ben Dror et al. | 358/1.9 |
| 6,181,825 B1 | * | 1/2001 | Ragland et al. | 382/239 |

* cited by examiner

Primary Examiner—Thomas D. Lee
Assistant Examiner—Stephen Brinich
(74) Attorney, Agent, or Firm—William Eipert (57) ABSTRACT

A method to compact a diffuse gray edge that is two pixels wide to a state where it is one pixel wide so that it may be well rendered with anti-alias rendering. The method identifies an observation window within continuous tone image data. The method then operates on the pixels within the observation window by: compacting horizontal features within the observation window; compacting vertical features within the observation window; and compacting corner features within the observation window.

20 Claims, 6 Drawing Sheets

| $x_1$ | $x_2$ | $x_3$ | $x_4$ | $x_5$ |
|---|---|---|---|---|
| $x_6$ | $x_7$ | $x_8$ | $x_9$ | $x_{10}$ |
| $x_{11}$ | $x_{12}$ | $x_{13}$ | $x_{14}$ | $x_{15}$ |
| $x_{16}$ | $x_{17}$ | $x_{18}$ | $x_{19}$ | $x_{20}$ |
| $x_{21}$ | $x_{22}$ | $x_{23}$ | $x_{24}$ | $x_{25}$ |

EDGE COMPACTION IN ANTIALIASED IMAGES

CROSS REFERENCE

Cross reference is made to co-pending U.S. patent application Ser. No. 09/217,224, entitled "System For Electronic Compensation of Beam Scan Trajectory Distortion" by Loce et al.

BACKGROUND OF THE INVENTION

This invention generally relates to printing antialiased images and other image structures having gray edges and, more particularly, to an edge restoration method that compacts gray pixels into neighboring edges.

Antialiasing in the context of digitizing line art and certain graphical image structures is well known as a method of using intermediate levels of intensity to achieve subpixel positioning to estimate the edges of lines and text. A major benefit of antialiased images is that high contrast, saturated objects are surrounded with pixels possessing intermediate gray values that visually suggest a higher resolution of object edges.

Generally, antialiased images contain gray edges that are a single pixel wide. Gray edges that are a single pixel wide can be well rendered using anti-aliasing rendering (AAR) techniques. However, some image processing functions can introduce gray pixels to an antialiased edge thereby broadening the edge to two or more pixels in width. For example, electronic image registration correction is an image processing technology used to compensate for misregistration of images written onto a photoreceptor. The misregistration could be due to a variety of sources, such as bow differences between raster output scanners in a multiple output scanner imaging system. Electronic registration correction often uses interpolation of pixel values to compensate for pixel positioning errors. The interpolation can have the effect of slightly blurring an edge, thereby increasing its gray content. If an input edge is antialiased, then the interpolated image may have gray edges that are two pixels wide. Additionally, scanning processes can blur an edge such that the edge contains two gray pixels. Similarly, some super-resolution processing techniques can blur an edge to two gray pixels in width.

Current antialias rendering techniques do not recognize gray edges that are two or more pixels wide, and thus the blurred edges will be halftoned. Halftoning antialiased edges that are two pixels wide can yield an undesirable beaded structure. Thus, what is needed is a method to compact a gray edge that is two pixels wide to a state where it is one pixel wide so that it may be well rendered with AAR.

SUMMARY OF THE INVENTION

In accordance with the present invention, there is provided a method for compacting diffuse gray edges. The method identifies a group of interested pixels with an observation window within continuous tone image data. The method then operates on the pixels within the observation window by: compacting horizontal features within the observation window; compacting vertical features within the observation window; and compacting corner features within the observation window.

In accordance with a second aspect of the invention there is provided, in a printing system having a digital front end for processing image data to generate print ready data, a method for compacting a diffuse gray edge. The method includes the steps of: receiving image data; identifying a target pixel within said received image data; analyzing pixels neighboring the target pixel to determine if the target pixel is within a diffuse gray edge; and compacting gray pixels within the diffuse gray edge.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

For a general understanding of the present invention, reference is made to the drawings. The present invention is described herein as processing gray-scale continuous tone (contone) image data. However, it should be understood that the present invention applies equally well to the processing of color images, wherein each color image separation is treated, effectively, as a gray-scale image. Accordingly, references herein to the processing of gray-scale images are intended to include the processing of color image separations as well.

Figure 1:
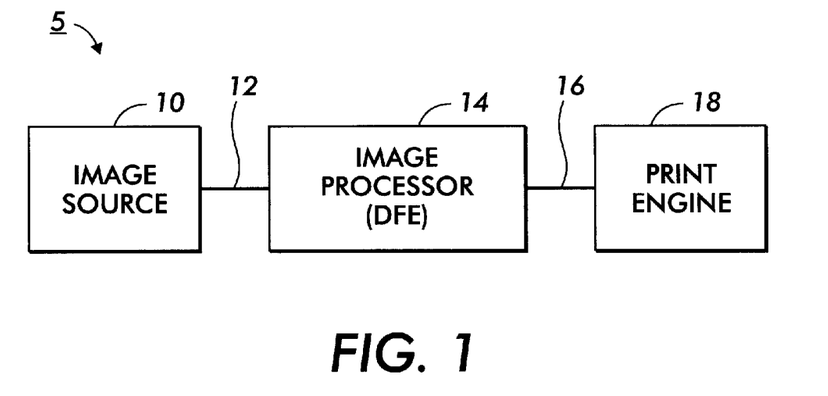
FIG. 1 is a general representation of a suitable system-level embodiment for one or more aspects of the present invention.

Referring to FIG. 1, there is shown an embodiment of a digital imaging system 5 that incorporates the features of the present invention. Digital imaging system 5 includes image source 10 that may include a scanner, a computer, a network or any similar or equivalent image input terminal to generate image data 12. Image data 12, representing an image to be printed, is supplied to an image processor 14 that may incorporate what is known in the art as a digital front end (DFE). Image processor 14 processes the received image data 12 to produce print ready binary data 16 that is supplied to a print engine 18. Print engine 18 is preferably a xerographic engine; however, engine 18 may include such equivalent alternatives as ink jet, etc. The present invention is directed towards aspects of image processor 14 depicted in FIG. 1. In particular, the intention of the present invention is to identify and process accordingly gray pixels within a diffuse or blurred gray edge.

Figure 2:
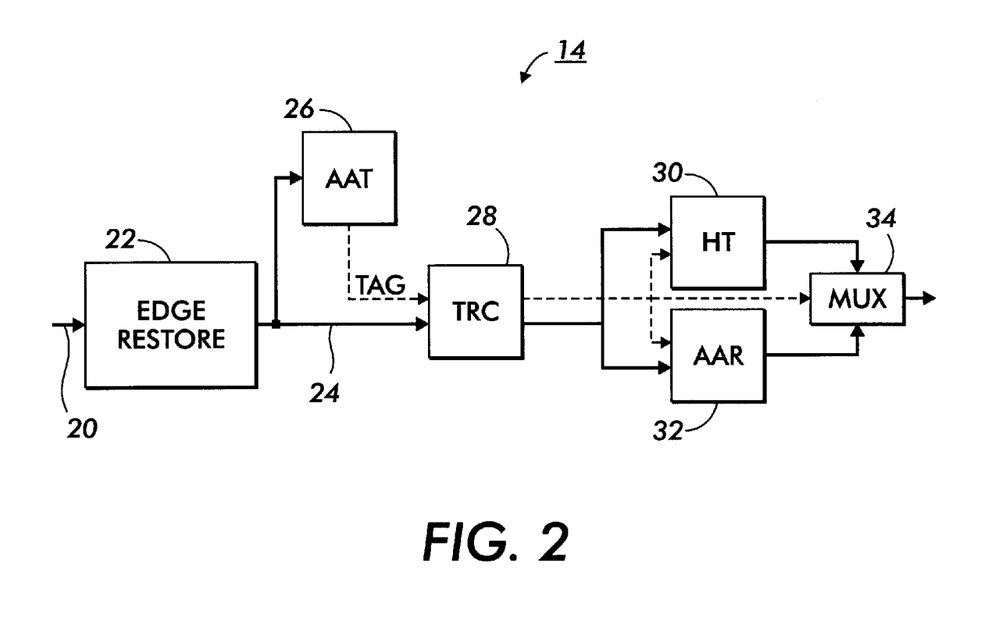
FIG. 2 illustrates the data flow through an image print path accordance with the present invention.

Referring now to FIG. 2, there is shown a detailed diagram depicting the data flow in an embodiment of the present invention. In FIG. 2, image processor 14 receives unprocessed image data and performs image analysis and/or processing functions (not shown), which may include page decomposition, background-detection, segmentation, color adjustment, electronic registration correction, etc., on the received image to generate contone image data 20 that is supplied to edge restoration block 22. Edge restoration block 22 operates on the contone image data to identify and process accordingly gray pixels within a diffuse gray edge. In particular block 22 analyzes a target pixel and a group of pixels neighboring or surrounding the target pixel to determine whether the target pixel is within a diffuse gray edge. A diffuse gray edge is presumed to be present when at least two gray pixels are present between a transition from a nearly saturated (black) pixel to a background (white) pixel. An affirmative determination will result in a subsequent compaction operation wherein the gray from one or more gray pixels more distant to the saturated pixel is shifted (donated) to the gray pixel adjoining the saturated pixel. Beneficially, edge restoration block 22 compacts a diffuse gray edge that is two pixels wide to a gray edge that is one pixel wide. The operation of edge restoration block 22 is described in further detail below with reference to FIGS. 3–13.

After converting gray edges that are two pixels wide into edges that are one pixel wide, the edge restored contone image 24 from edge restoration block 22 can be processed in a conventional manner. For example, contone image 24 may be processed (rendered) to transform the image into output data for subsequent printing or display. That is, the edge restored contone image 24 is coupled to anti-alias tagging (AAT) module 26 and tone reproduction curve (TRC) module 28. AAT module 26 conducts an analysis of the neighborhood of the gray pixels to determine if the gray pixel represents a true gray value or an antialiased edge. AAT module 26 tags those pixels within image 24 determined to be antialiased and outputs the antialiased tag to TRC module 28.

At TRC module 28, the tags generated by AAT module 26 are employed in conjunction with the associated pixel values to modify the pixel values in a known manner. Subsequently, the modified pixels and their associated tags are passed to a pair of processing modules—halftoning module 30 and anti-aliased rendering (AAR) module 32. Although depicted as parallel functions, the processing carried out therein may be accomplished using a single processing block operating serially. The tags are supplied to both modules to control processing therein, and are also used as a select signal in multiplexer 34. Multiplexer 34 selectively passes print ready data from halftoning module 30 or AAR module 32 to a ROS in response to the tags received from TRC module 28.

Figure 3:
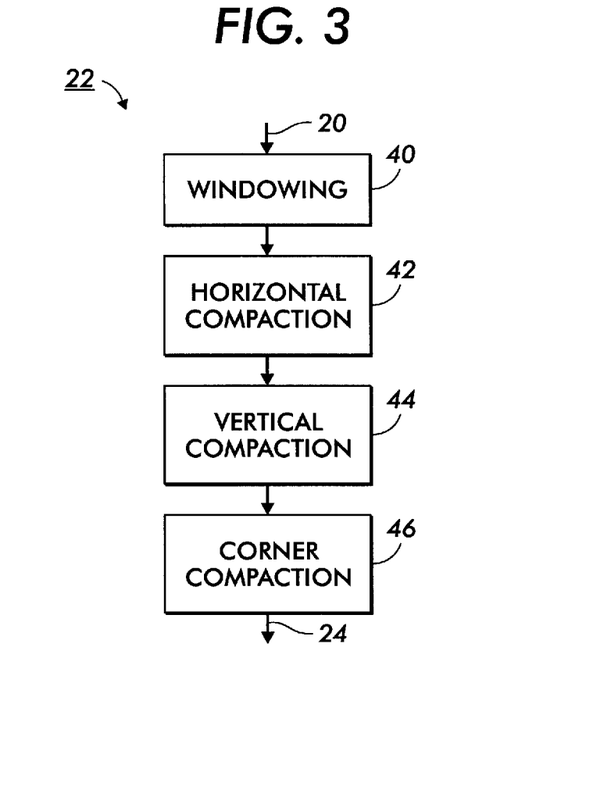
FIG. 3 is a generalized data flow representation of one embodiment of the present invention.
Figure 4:
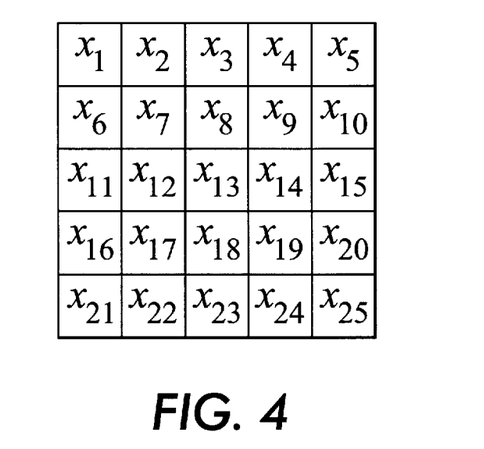
FIG. 4 is an exemplary 5×5 observation window employed by an embodiment of the present invention.

Referring to FIG. 3, there is shown a diagram illustrating the data flow through an embodiment of edge restoration block 22. Edge restoration block receives contone image data 20 that may comprise an entire image or a portion of an image. At block 40 a target pixel from image data 20 along with the group of pixels neighboring or surrounding the target pixel are identified. Beneficially, this operation is performed using a 5×5 observation window about the target pixel ($x_{13}$) as illustrated in FIG. 4.

After identifying the current target pixel $x_{13}$ and the surrounding pixels within the observation window, the target pixel and the surrounding pixels are passed through a series of three compaction modules, horizontal compaction module 42, vertical compaction module 44 and corner compaction module 46. Each of the compaction modules 42, 44 and 46 operates on the pixels within the observation window to compact one of three specific edge features. Horizontal compaction module 42 uses a vertical slice through the center of the observation window ($x_3$, $x_8$, $x_{13}$, $x_{18}$, $x_{23}$) to compact horizontal features. Vertical compaction module 44 compacts vertical features using a horizontal slice through the center of the window ($x_{11}$, $x_{12}$, $x_{13}$, $x_{14}$, $x_{15}$). Horizontal compaction module 42 together with vertical compaction module 44 will treat gray edge compaction for angled features. Corner compaction module 46 uses the entire window to compact corner features.

The horizontal, vertical, and corner compaction modules each operate on the pixels within the observation window in substantially the same manner. Each compaction module analyzes the target pixel and the pixels neighboring the target pixel to determine whether the target pixel is within a diffuse gray edge. If the target pixel is within a diffuse gray edge, the module compacts the specific features associated with that module. When analyzing a target pixel and neighboring pixels to determine if the target pixel is within a diffuse gray edge, each compaction module looks for a specific diffuse edge condition. Horizontal compaction looks for a diffuse horizontal edge defined by two gray pixels between the pixel pair $x_3$ and $x_{18}$ or between the pixel pair $x_8$ and $x_{23}$ wherein one pixel in each pair is a saturated pixel and one pixel is a background pixel. Vertical compaction looks for a diffuse vertical edge defined by two gray pixels between a saturated pixel and a background pixel within pixels $x_{12}$–$x_{15}$ or pixels $x_{11}$–$x_{14}$. Corner compaction looks for a diffuse corner represented by four gray pixels bordered by five background pixels in the quadrant opposite to the saturated pixel. One such example of a diffuse corner is given by saturated pixel $x_5$ opposite gray pixels $x_8$, $x_9$, $x_{13}$ and $x_{14}$ bordered by background pixels $x_7$, $x_{12}$, $x_{17}$, $x_{18}$ and $x_{19}$.

Figure 5:
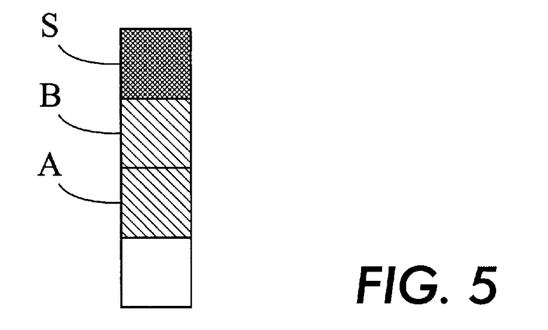
FIGS. 5–12 illustrate various pixel patterns that trigger compaction.
Figure 6:
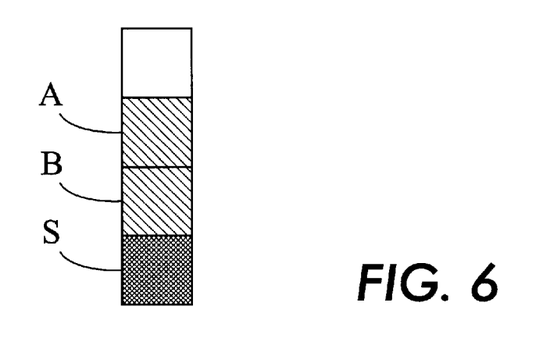
Figure 7:
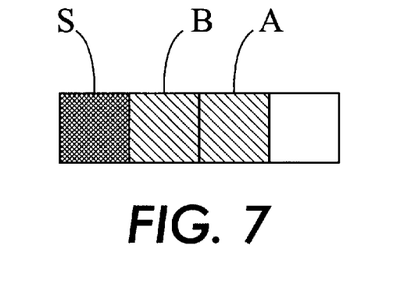
Figure 8:
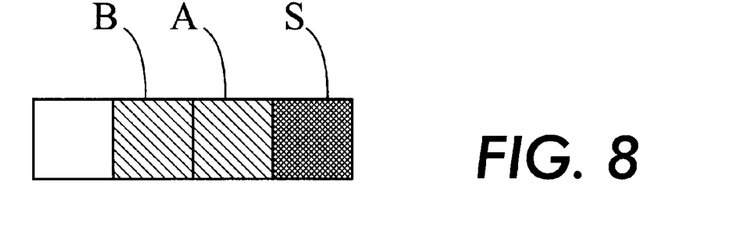
Figure 9:
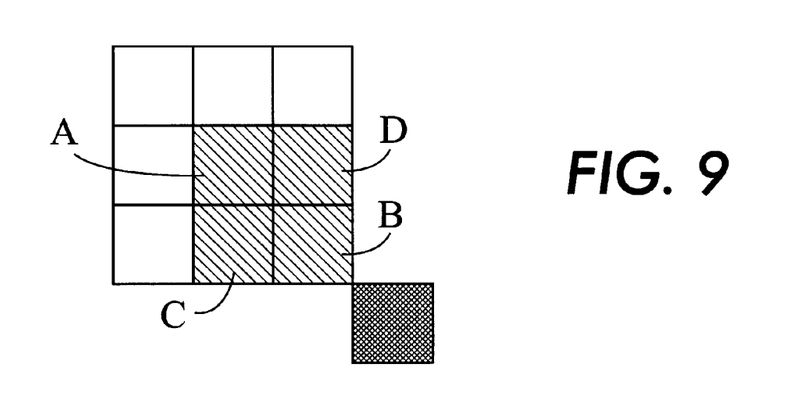

The diffuse edge conditions described above (diffuse horizontal edge, diffuse vertical edge, and diffuse corner) can easily be represented by compaction patterns. Therefore, the analysis of target pixel and pixels neighboring the target pixel to determine if the target pixel is within a diffuse gray edge can be easily accomplished using pattern matching or template matching techniques as are known in the art of digital image processing. FIGS. 5–12 illustrate the compaction patterns needed to identify the three diffuse edge conditions. FIGS. 5 and 6 illustrate the two compaction patterns that identify a diffuse horizontal edge and, when present, trigger horizontal compaction. FIGS. 7 and 8 illustrate the two compaction patterns that identify a diffuse vertical edge and trigger vertical compaction. The four compaction patterns needed to identify diffuse corners and trigger corner compaction are illustrated in FIGS. 9–12. In each of the FIGS. 5–12, double cross-hatched pixel represents a saturated or near-saturated pixel, an unfilled (white) pixel identifies a background pixel, and the cross-hatched pixels A, B, C and D indicate gray pixels. In the compaction patterns shown in FIGS. 5–8, pixel A identifies the gray pixel that is more distant to saturated pixel S, and pixel B identifies the gray pixel that is adjoining saturated pixel S. In each of the patterns of FIGS. 9–12, pixel B is a gray neighbor of saturated pixel S and pixels A, C, and D are connected to pixel B and in the quadrant opposite to the saturated pixel.

As previously indicated, the determination that the target pixel is within a diffuse gray edge will result in a subsequent operation to compact a specific edge feature. Each of the compaction modules 42, 44 and 46 operates on the pixels within the observation window to compact a specific edge feature by shifting gray from a pixel that is more distant to a saturated pixel to a pixel that is adjoining the saturated pixel. Horizontal compaction module 42 shifts gray from pixel A to pixel B whenever the compaction patterns shown in FIGS. 5 and 6 are found. Similarly, vertical compaction module 44 shifts gray from pixel A to pixel B when either of the compaction patterns shown in FIGS. 7 and 8 is found. Both horizontal compaction module 42 and vertical compaction module 44 use the same rules for shifting gray from pixel A to pixel B. Assuming the value of saturated pixel is 255, the rules used by modules 42 and 44 for shifting gray between pixels A and B are given by:

$$\text{Output pixel } B' = \min(255, B+A) \quad (1)$$

$$\text{Output pixel } A' = A - [\min(255, B+A)] = A - B' + B \quad (2)$$

wherein A' and B' are the values of the pixels after shifting gray.

Corner compaction module 46 shifts gray to pixel B from a combination of pixels A, C and D when any of the four compaction patterns of FIGS. 9–12 are found. Beneficially, module 46 first shifts gray from pixel A to pixel B using the rules given in equations (1) and (2). If the shift of gray from pixel A to pixel B does not saturate pixel B (i.e., B'<255), gray is then shifted from one of the remaining pixels onto the modified pixel B (B') using equations similar to equations (1) and (2) but with a different donor and B being defined by the modified value. That is, shifting gray from pixel C onto the modified pixel B is given by following:

$$\text{Output pixel } B'' = \min(255, B'+C) \quad (3)$$

$$\text{Output pixel } C' = C - [\min(255, B'+C)] = C - B'' + B' \quad (4)$$

If pixel B is still not saturated (i.e., B''<255), then a third shift of gray from the remaining pixel (here, pixel D) is performed as follows:

$$\text{Output pixel } B''' = \min(255, B''+D) \quad (5)$$

$$\text{Output pixel } D' = D - [\min(255, B''+D)] = D - B''' + B'' \quad (6)$$

It should be appreciated that other methods of shifting gray from pixels A, C and D to pixel B may be employed. For example, corner compaction can, as a second step, shift gray from the neighboring pixels C and D using linear combinations of pixels C and D.

Figure 13:
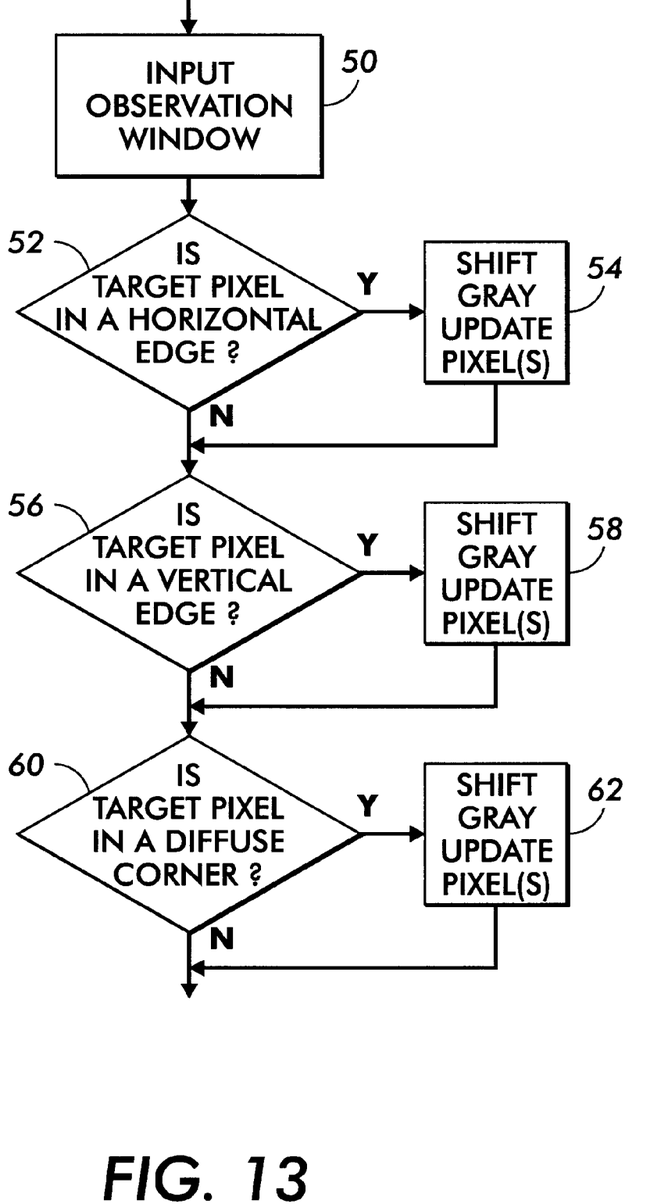
FIG. 13 schematically illustrates an embodiment of the edge compaction method in accordance with the present invention.

Having briefly described the data flow of an embodiment of the present invention attention is now turned to FIG. 13 which further illustrates an embodiment of the edge compaction method in accordance with the present invention. FIG. 13 is a schematic illustration of various steps in an edge compaction process in accordance with the present invention and an alternate representation of the data flow through an embodiment of edge restoration block 22 of FIG. 3. At block 50, an observation window comprising a target pixel along with a group of pixels neighboring the target pixel is identified. At test block 52 the target pixel and a set of neighboring pixels are analyzed to determine if the target pixel is within a diffuse horizontal edge. Beneficially, block 52 uses pattern matching or template matching techniques to identify a diffuse horizontal edge. More specifically, block 52 analyzes the vertical slice through the center of the observation window ($x_3$, $x_8$, $x_{13}$, $x_{18}$, $x_{23}$) using pattern or template matching techniques to determine if either of the compaction patterns shown in FIGS. 5 and 6 are present.

Alternative methods that are also within the scope of the present invention contemplate determining if the target pixel is within a diffuse horizontal edge by analyzing gray pixels using techniques for identifying antialiased edges. Using antialiased tagging techniques analysis of the neighborhood of the target may be conducted, and if it borders a gray pixel on one side and occurs and at an abrupt transition between dark and light regions (e.g. the target pixel and the gray bordering pixel have a nearly saturated (black) pixel on one side and a background (white) pixel on the opposite side), then it is reasonable to assume that the target pixel is within a diffuse edge. Furthermore, techniques for identifying thin gray lines by counting transitions along cuts within the observation window may be adapted to a identify diffuse edges by requiring one transition to be between saturated and gray pixels and one transition to be between gray and background pixels. That is, the analysis of the target the target pixel and the pixels neighboring the target pixel may look for a transition from a saturated pixel to gray pixels and then a transition from gray to background along specific cuts within the observation window.

More information on techniques for identifying and tagging antialiased pixels, and more specifically, techniques for identifying and tagging thin gray lines that can be adapted for the identification of diffuse gray edge can be found in the following co-pending, commonly assigned U.S. patent applications: "Method For Generating Rendering Tags To Facilitate The Printing Of Antialiased Images," P. Crean et al., application Ser. No. 09/046,232; "Tagging Of Antialiased Images," R. Loce et al., application Ser. No. 09/046,424; "Method To Enable The Recognition And Rendering Of Antialiased Images," R. Loce et al., application Ser. No. 09/046,414; and "Memory-Efficient Tagging Of Antialiased Images," S. Harrington et al., application Ser. No. 09/046,426, which are hereby incorporated by reference herein.

A negative determination at block 52 indicates that there are no horizontal features to compact and the compaction process continues with test block 56, described below. An affirmative determination at block 52, will result in a subsequent operation, at block 54 to shift gray from a pixel that is more distant to a saturated pixel to a pixel that is adjoining the saturated pixel in accordance with equations (1) and (2) above. After shifting gray between pixels in the diffuse edge, block 54 updates pixel values within the image data. In updating pixel values in the image data, block 54 may employ a "conventional window" approach wherein the block generates a single output pixel corresponding to the modified target pixel that is used to generate the edge restored image data. With this approach, the observation window always views unmodified, original image pixels. Alternatively, block 54 may employ a "diffusion" approach wherein the block modifies the gray values of the pixels in the observation window effected by the shifting operation. With either approach, after updating pixel values the compaction process continues at test block 56.

Test block 56 analyzes the target pixel and a set of neighboring pixels within the observation window to determine if the target pixel is within a diffuse vertical edge. More specifically, block 56 analyzes the horizontal slice through the center of the compaction window ($x_{11}$, $x_{12}$, $x_{13}$, $x_{14}$, $x_{15}$) to determine if either of the compaction patterns shown in FIGS. 7 and 8 are present. The presence of either compaction pattern triggers the processing of block 58 to shift gray between pixels in the diffuse edge in accordance with equations (1) and (2) and then update pixel values to generate edge restored image data. In updating pixel values, block 58 employs the same approach ("conventional window" or "diffusion") used by block 54.

Test block performs an analysis on the pixels within the observation window to determine if the target pixel is within a diffuse corner after a negative determination at test block 56 or after the shifting and updating operations of block 58. Beneficially, test block 60 uses pattern matching or template matching techniques to determine if any of the compaction patterns shown in FIGS. 9–12 are present. If any of the four compaction patterns shown in FIG. 9–12 are found, block 62 shift gray between pixels within the diffuse corner and updates pixel values using the same approach employed at block 54 and 58.

An example of a compaction process is characterized below for the purpose of illustration and not for the purpose of limiting the scope of the present invention. Suppose the observation window comprises the pixel values as shown:

| 154 | 74  | 0   | 0   | 0 |
|-----|-----|-----|-----|---|
| 255 | 150 | 0   | 0   | 0 |
| 255 | 255 | 216 | 76  | 0 |
| 255 | 255 | 228 | 88  | 0 |
| 255 | 255 | 255 | 101 | 0 |

Wherein 25 pixels can be identified $x_1, x_2, \ldots, x_{25}$ and are position/oriented as shown in FIG. 4. As previously stated, the step is determining if the target pixel $x_{13}$ is within a diffuse horizontal edge. By inspection of the pixel values, it can be seen that pixels $x_8, x_{13}, x_{18}$ and $x_{23}$ comprise a diffuse a horizontal edge. The next step is then shifting gray between pixel $x_{13}$ to $x_{18}$ resulting in modified pixel values for pixels $x_{13}$ and $x_{18}$ of 189 and 255, respectively. Employing a diffusion approach, the pixel values are updated in the observation window resulting in an observation window comprising modified image data given by pixel values:

| 154 | 74  | 0   | 0   | 0 |
|-----|-----|-----|-----|---|
| 255 | 150 | 0   | 0   | 0 |
| 255 | 255 | 189 | 76  | 0 |
| 255 | 255 | 255 | 88  | 0 |
| 255 | 255 | 255 | 101 | 0 |

Using the modified image data, the next step identifies a diffuse vertical edge at pixels $x_{12}, x_{13}, x_{14}$ and $x_{15}$ resulting a second shifting and updating operation. The shifting operation shift gray from pixel $x_{14}$ to pixel $x_{13}$. Using equations (1) and (2) the modified pixel values for pixels $x_{13}$ and $x_{14}$ are 255 and 10, respectively. Updating the pixels yields an observation window given by:

| 154 | 74  | 0   | 0   | 0 |
|-----|-----|-----|-----|---|
| 255 | 150 | 0   | 0   | 0 |
| 255 | 255 | 255 | 10  | 0 |
| 255 | 255 | 255 | 88  | 0 |
| 255 | 255 | 255 | 101 | 0 |

The updated image data is passed to the next step which analyzes pixels within the window to determine if the target pixel is within a diffuse gray corner. As the target pixel is not within a gray corner, the compaction processing for this window is complete.

Figure 10:
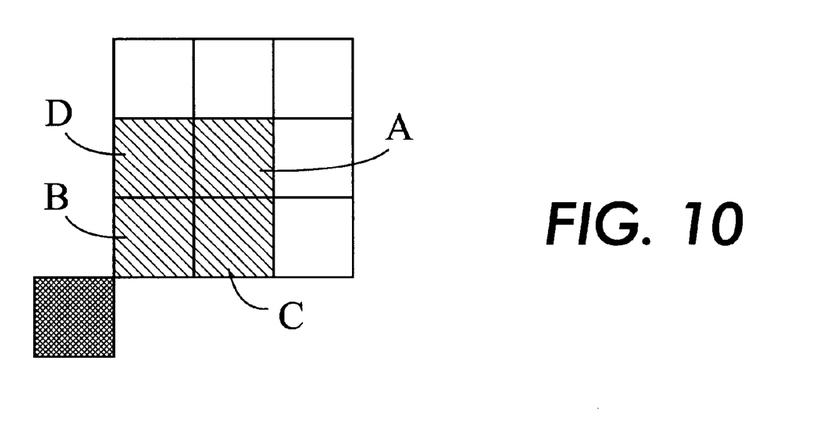
Figure 11:
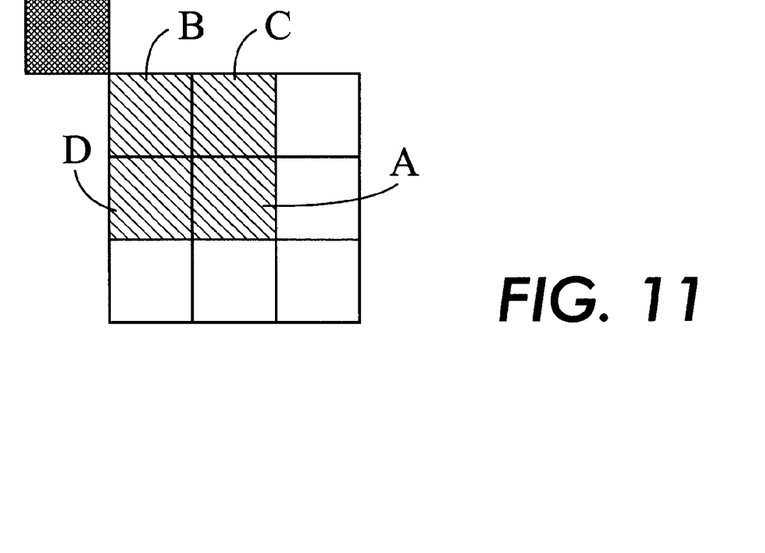
Figure 12:
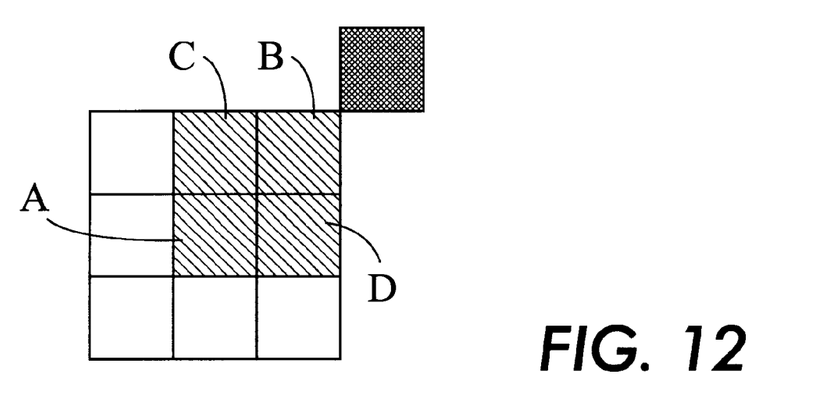

An example of a corner compaction process is characterized below for the purposes of illustration and not for the purpose of limiting the scope of the present invention. Assuming an observation window comprises the pixel values as shown:

| 0   | 0   | 0   | 0   | 0 |
|-----|-----|-----|-----|---|
| 0   | 0   | 0   | 0   | 0 |
| 72  | 39  | 29  | 64  | 0 |
| 255 | 255 | 122 | 53  | 0 |
| 255 | 255 | 134 | 109 | 0 | wherein a diffuse corner matching the compaction pattern of FIG. 10 is defined by saturated pixel $x_{22}$ opposite gray pixels $x_{13}, x_{14}, x_{18}$ and $x_{19}$ bordered by background pixels $x_8, x_9, x_{10}, x_{15}$ and $x_{20}$. Using equations (1) and (2) gray is shifted from pixel A to pixel B (pixel $x_{14}$ to $x_{18}$) resulting in modified pixel values for pixels $x_{14}$ and $x_{18}$ of 0 and 186, respectively. As pixel $x_{18}$ is not fully saturated, gray is shifted from pixel C (pixel $x_{19}$) according to equations (4) and (5) yielding pixel values of pixels $x_{18}$ and $x_{19}$ of 239 and 0, respectively. to fully saturate pixel $x_{18}$ a third shift of gray from pixel D (here, pixel $x_{13}$) is performed resulting in pixel values for pixels $x_{13}$ and $x_{18}$ of 13 and 255, respectively.

Under a conventional window approach, the corner compaction process provides a single output pixel value of 13 corresponding to the modified target pixel $x_{13}$ that is used to generate the edge restored image data. Employing a diffusion approach, the pixel values are updated in the observation window resulting in an observation window comprising the pixel values:

| 0   | 0   | 0   | 0   | 0 |
|-----|-----|-----|-----|---|
| 0   | 0   | 0   | 0   | 0 |
| 72  | 39  | 13  | 0   | 0 |
| 255 | 255 | 255 | 0   | 0 |
| 255 | 255 | 134 | 109 | 0 |

It is apparent that there has been provided, in accordance with the present invention, an edge restoration method for compacting a diffuse gray edge that is two pixels wide to a gray edge that is one pixel wide to enable the printing of antialiased images and other image structures having gray edges. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for compacting a diffuse gray edge, comprising the steps of:
   identifying an observation window within continuous tone image data, said observation window including a target pixel;
   determining if said target pixel is within a diffuse horizontal edge; and
   compacting horizontal features within said observation window,
   wherein said step of compacting horizontal features comprises shifting gray from a first pixel (A) that is not adjacent to a saturated pixel to a second pixel (B) that is adjacent to a saturated pixel; and
   updating a pixel value in response to said shifting step.

2. The method of claim 1 wherein said gray is shifted from said first pixel A to said second pixel B according to $$B' = \min(255, B+A)$$

$$A' = A - [\min(255, B+A)] = A - B' + B$$

wherein A' and B' are the values of said first and second pixels after shifting gray.

3. The method according to claim 1, wherein said step of updating a pixel value comprises providing a modified value for said target pixel.

4. The method according to claim 1, wherein said step of updating a pixel value modifies the values of pixels within said observation window.

5. A method for compacting a diffuse gray edge, comprising the steps of
identifying an observation window within continuous tone image data, said observation window including a target pixel; and
compacting vertical features within said observation window, wherein said step of compacting vertical features comprises
determining if said target pixel is within a diffuse vertical edge,
shifting gray from a first pixel (A) that is not adjacent to a saturated pixel to a second pixel (B) that is adjacent to a saturated pixel, and
updating a pixel value in response to said shifting step.

6. The method of claim 5 wherein said gray is shifted from said first pixel A to said second pixel B according to $$B'=\min(255, B+A)$$

$$A'=A-[\min(255, B+A)]=A-B'+B$$

wherein A' and B' are the values of said first and second pixels after shifting gray.

7. A method for compacting a diffuse gray edge, comprising the steps of:
identifying an observation window within continuous tone image data, said observation window including a target pixel;
compacting horizontal features within said observation window;
compacting vertical features within said observation window; and
compacting corner features within said observation window, wherein:
said step of compacting horizontal features modifies said target pixel and a first pixel adjacent said target pixel by shifting gray between said target pixel and said first pixel when said target pixel is within a diffuse horizontal edge,
said step of compacting vertical features modifies said target pixel and a second pixel adjacent said target pixel by shifting gray between said target pixel and said second pixel when said target pixel is within a diffuse vertical edge, and
said step of compacting corner features modifies a pixel within said compaction window when said target pixel is within a diffuse corner.

8. The method according to claim 7, wherein said step of compacting horizontal features and said step of compacting vertical features are performed before said step of compacting corner features.

9. A method for compacting a diffuse gray edge, comprising the steps of:
identifying an observation window within continuous tone image data, said observation window including a target pixel;
determining if said target pixel is within a diffuse corner;
shifting gray from a first pixel (A) that is not adjacent to a saturated pixel to a second pixel (B) that is adjacent to a saturated pixel; and
updating a pixel value in response to said shifting step.

10. The method of claim 9 wherein said gray is shifted from said first pixel A to said second pixel B according to $$B'=\min(255, B+A)$$

$$A'=A-[\min(255, B+A)]=A-B'+B$$

wherein A' and B' are the values of said first and second pixels after shifting gray.

11. The method of claim 9 further comprising the step of shifting gray from a third pixel (C) to said second pixel B.

12. The method of claim 11 wherein said gray is shifted from said third pixel C to said second pixel B according to $$B''=\min(255, B'+C)$$

$$C'=C-[\min(255, B'+C)]=C-B''+B'$$

wherein B'' and C' are the values of said second and third pixels after shifting gray.

13. The method of claim 11 further comprising the step of shifting gray from a fourth pixel (D) to said second pixel B.

14. The method according to claim 9, wherein said step of updating a pixel value comprises providing a modified value for said target pixel.

15. The method according to claim 9, wherein said step of updating a pixel value modifies the values of pixels within said observation window.

16. In a printing system having a digital front end for processing image data to generate print ready data, a method for compacting a diffuse gray edge, comprising the steps of:
receiving continuous tone image data;
identifying a target pixel within said received continuous tone image data;
analyzing pixels neighboring said target pixel to determine if said target pixel is within a diffuse gray edge; and
compacting gray pixels within said diffuse gray edge.

17. The method of claim 16, wherein said step of compacting gray pixels within said diffuse gray edge comprises:
analyzing pixels neighboring said target pixel to determine if said target pixel is within a diffuse horizontal edge;
analyzing pixels neighboring said target pixel to determine if said target pixel is within a diffuse vertical edge; and
analyzing pixels neighboring said target pixel to determine if said target pixel is within a diffuse corner.

18. The method of claim 16, wherein said step of compacting gray pixels within said diffuse gray edge comprises:
shifting gray between pixels within a diffuse horizontal edge in response to a first edge condition;
shifting gray between pixels within a diffuse vertical edge in response to a second condition; and
shifting gray between pixels within a diffuse corner in response to a third condition.

19. The method of claim 18, wherein:
said step of shifting gray between pixels within a diffuse horizontal edge comprises shifting gray from a first pixel that is not adjacent to a saturated pixel to a second pixel that is adjacent to a saturated pixel;
said step of shifting gray between pixels within a diffuse vertical edge comprises shifting gray from a pixel that is not adjacent to a saturated pixel to a second pixel that is adjacent to a saturated pixel; and said step of shifting gray between pixels within a diffuse corner comprises shifting gray from a pixel that is not adjacent to a saturated pixel to a second pixel that is adjacent to a saturated pixel.

20. The method of claim 16, wherein said step of compacting gray pixels within said diffuse gray edge comprises:

shifting gray from a first pixel that is not adjacent to a saturated pixel to a second pixel that is adjacent to a saturated pixel, and updating a pixel value in response to said shifting step.

* * * * *